(12) United States Patent
Sabouri-Sichani et al.

(10) Patent No.: US 12,507,225 B2
(45) Date of Patent: Dec. 23, 2025

(54) DYNAMIC REPORTING OF CAPABILITY LIMITATION IN TELECOMMUNICATION SYSTEMS

(71) Applicant: NOKIA TECHNOLOGIES OY, Espoo (FI)

(72) Inventors: Faranaz Sabouri-Sichani, Aalborg (DK); Frank Frederiksen, Klarup (DK); Knud Knudsen, Aabybro (DK); Thomas Haaning Jacobsen, Nørresundby (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 680 days.

(21) Appl. No.: 17/904,183

(22) PCT Filed: Feb. 14, 2020

(86) PCT No.: PCT/EP2020/053902
§ 371 (c)(1),
(2) Date: Aug. 12, 2022

(87) PCT Pub. No.: WO2021/160284
PCT Pub. Date: Aug. 19, 2021

(65) Prior Publication Data
US 2023/0091739 A1   Mar. 23, 2023

(51) Int. Cl.
*H04W 72/0453* (2023.01)
*H04W 8/24* (2009.01)
*H04W 72/51* (2023.01)

(52) U.S. Cl.
CPC ......... *H04W 72/0453* (2013.01); *H04W 8/24* (2013.01); *H04W 72/51* (2023.01)

(58) Field of Classification Search
CPC ... H04W 72/0453; H04W 72/51; H04W 8/24; H04W 88/06
See application file for complete search history.

(56) References Cited

U.S. PATENT DOCUMENTS

2015/0264602 A1   9/2015 Hageltorn et al.
2016/0219648 A1   7/2016 Awoniyi-Oteri et al.
(Continued)

FOREIGN PATENT DOCUMENTS

CN   104205959 A   12/2014
CN   104918295 A   9/2015
(Continued)

OTHER PUBLICATIONS

Office Action for India Application No. 202247051618, mailed on Nov. 29, 2022, 6 pages.
(Continued)

*Primary Examiner* — Sulaiman Nooristany
(74) *Attorney, Agent, or Firm* — Barta Jones, PLLC

(57) ABSTRACT

A method comprises causing communication with a first network using at least a part of at least one first frequency band. The communication with the first network is associated with a first identity. The method comprises causing a first message to be transmitted to a second network. The communication with the second network is associated with a second, different identity. The message comprises information indicating the at least a part of at least one first frequency band.

4 Claims, 9 Drawing Sheets

(56) References Cited

U.S. PATENT DOCUMENTS

| | | | |
|---|---|---|---|
| 2016/0262053 | A1 | 9/2016 | Palm et al. |
| 2017/0041976 | A1 | 2/2017 | Van et al. |
| 2017/0048839 | A1 | 2/2017 | Henttonen et al. |
| 2017/0094628 | A1 | 3/2017 | Miao et al. |
| 2017/0171902 | A1* | 6/2017 | Tillman ............... H04W 76/16 |
| 2018/0006774 | A1 | 1/2018 | Yiu et al. |
| 2018/0227904 | A1 | 8/2018 | Raghunathan et al. |
| 2019/0261371 | A1 | 8/2019 | Kim et al. |
| 2019/0268127 | A1 | 8/2019 | Hosseini et al. |
| 2019/0306925 | A1 | 10/2019 | Iskander et al. |
| 2020/0022036 | A1 | 1/2020 | Lee et al. |
| 2022/0295445 | A1* | 9/2022 | Göktepe ............. H04W 60/005 |

FOREIGN PATENT DOCUMENTS

| | | |
|---|---|---|
| CN | 106465134 A | 2/2017 |
| CN | 108141798 A | 6/2018 |
| EP | 3149988 A1 | 4/2017 |
| EP | 3149988 B1 | 5/2019 |
| WO | 2014/071619 A1 | 5/2014 |
| WO | 2015/180779 A1 | 12/2015 |

OTHER PUBLICATIONS

"Revised SID: Study on system enablers for multi-SIM devices", TSG SA Meeting #SP-83, SP-190248, Agenda Item: 17B. 19, SA WG2, Mar. 20-22, 2019, 4 pages.

"3rd Generation Partnership Project; Technical Specification Group Services and System Aspects; Study on system enablers for devices having multiple Universal Subscriber Identity Modules (USIM) (Release 17)", 3GPP TR 23.761, V0.1.0, Oct. 2019, pp. 1-10.

"New Rel-17 SID proposal: Study on multi-SIM devices in RAN", 3GPP TSG RAN Meeting #83, RP-190282, Agenda Item: 9.1.2, vivo, Mar. 18- 21, 2019, 4 pages.

"3rd Generation Partnership Project; Technical Specification Group Services and System Aspects; Study on Support for Multi-USIM Devices (Release 17)", 3GPP TR 22.834, V17.1.0, Sep. 2019, pp. 1-16.

"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.

"3rd Generation Partnership Project; Technical Specification Group Radio Access Network; NR; User Equipment (UE) radio transmission and reception; Part 1: Range 1 Standalone (Release 15)", 3GPP TS 38.101-1, V15.7.0, Sep. 2019, pp. 1-234.

"3rd Generation Partnership Project; Technical Specification Group Radio Access Network; NR; Medium Access Control (MAC) protocol specification (Release 15)", 3GPP TS 38.321, V15.7.0, Sep. 2019, pp. 1-78.

"Correction on supportedBandwidthCombinationSetEUTRA-v1530 usage", 3GPP TSG-RAN WG2 Meeting #105, R2-1902631, Intel Corporation, Feb. 25-Mar. 1, 2019, 3 pages.

Office Action received for corresponding Chinese Patent Application No. 202080096706.6, dated Sep. 7, 2023, 8 pages of Office Action and no page of translation available.

Office Action received for corresponding Chinese Patent Application No. 202080096706.6, dated Mar. 29, 2024, 7 pages of Office Action and no page of translation available.

Notice of Allowance received for corresponding Chinese Patent Application No. 202080096706.6, dated Jun. 24, 2024, 4 pages of Notice of Allowance and no page of translation available.

"X2AP CR for support of NR Multiple frequency band in EN-DC", 3GPP TSG-RAN3 Meeting #100, R3-183529, Ericsson, May 21-25, 2018, 24 pages.

Office action received for corresponding European Patent Application No. 20705932.0, dated Jan. 21, 2025, 6 pages.

International Search Report and Written Opinion for International Application No. PCT/EP2020/053902; mailed on Nov. 9, 2020; 12 pages.

3GPP TSG-RAN WG2 Meeting #99; R2-1707835; "LTE/NR UE Capability Dependency and Coordination"; Agenda item: 10.2.6.3; Berlin, Germany; Aug. 21-25, 2017; 45 pages.

* cited by examiner

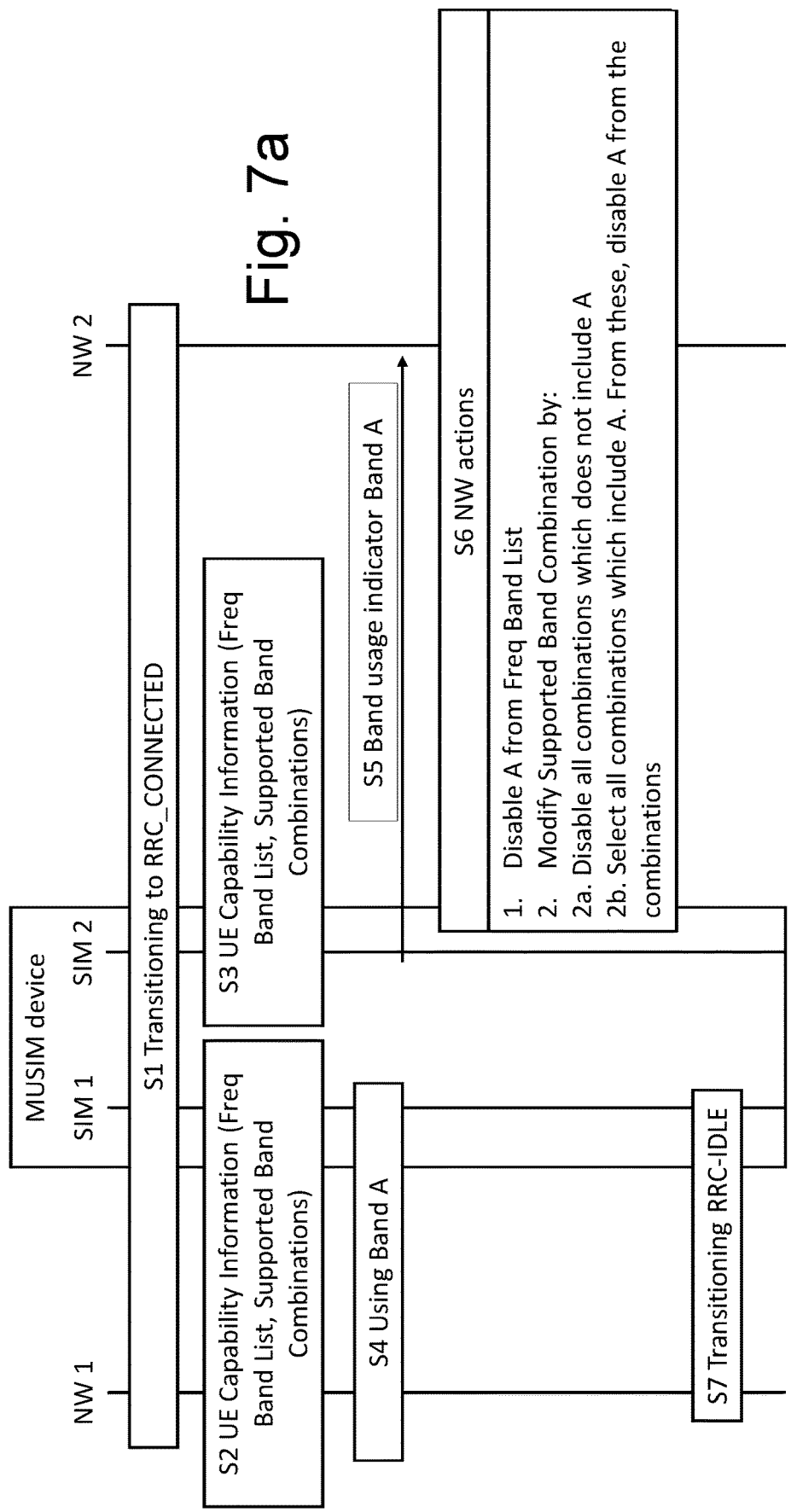

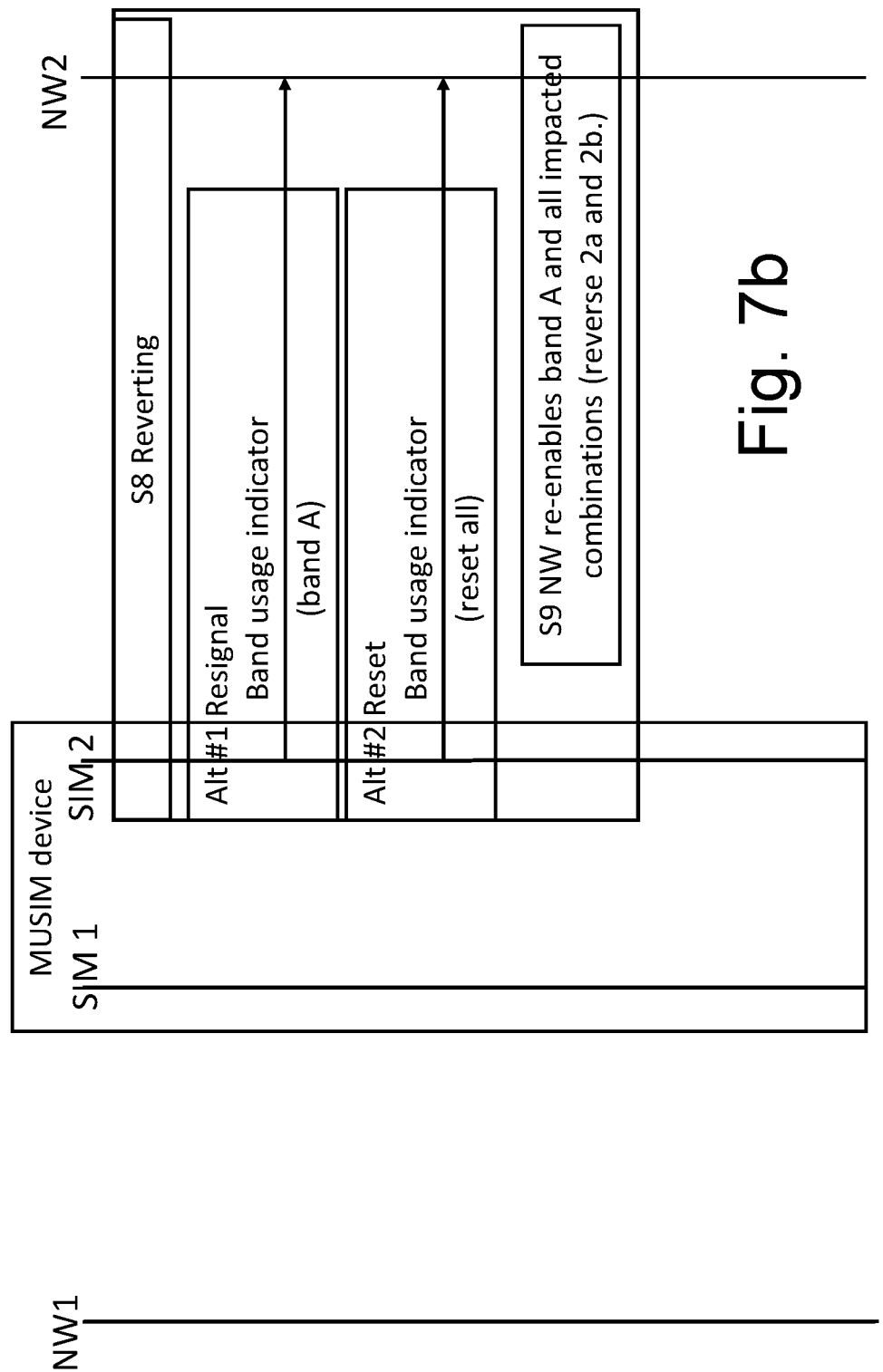

DYNAMIC REPORTING OF CAPABILITY LIMITATION IN TELECOMMUNICATION SYSTEMS

CROSS-REFERENCE TO RELATED APPLICATIONS

This application is a national stage entry of International Application No. PCT/EP2020/053902, filed Feb. 14, 2020, entitled "DYNAMIC REPORTING OF CAPABILITY LIMITATION IN TELECOMMUNICATION SYSTEMS" which is hereby incorporated by reference in its entirety.

FIELD OF THE DISCLOSURE

The present disclosure relates to an apparatus, a method, and a computer program and in particular but not exclusively for apparatus, methods and computer programs for use where a communication device is associated with a plurality of identities.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided an apparatus in a communications device supporting a plurality of different identities, the apparatus comprising at least one processor and at least one memory including computer program code, the at least one memory and computer program code configured to, with the at least one processor, cause the apparatus at least to: cause communication with a first network using at least a part of at least one first frequency band, communication with the first network being associated with a first identity; and cause a first message to be transmitted to a second network, communication with the second network being associated with a second, different identity, said message comprising information indicating the at least a part of at least one first frequency band.

One or more of the identities comprises one or more of: a universal subscriber identity module identity; an electronic subscriber identity module identity; and a subscriber identity module identity.

The at least a part of at least one first frequency band may comprise a group of a plurality of frequency bands.

The first network may be one of the same or different to the second network.

The first network may be provided by a first network operator and the second network may be provided by a different network provider.

The first network may be provided by a first network operator and the second network may be provided by the first network provider.

The at least one memory and computer program code may be configured to, with the at least one processor, cause the apparatus at least to cause a second message to be transmitted to the second network, when the at least a part of at least one first frequency band is no longer available for communicating with the first network, the second message comprising information indicating to the second network that the at least a part of at least one first frequency band is no longer available for communications with the first network The second message may comprise information identifying the at least a part of at least one first frequency band.

The second message may comprise a reset message.

The reset message may clear the information from the first message.

The at least one memory and computer program code may be configured to, with the at least one processor, cause the apparatus at least to, prior to communication with the first network using the at least a part of at least one first frequency band, cause at least one third message to be transmitted to the first network and at least one third message to be transmitted to the second network, at least one third message comprising information about one or more frequency bands supported by the communications device.

The information about one or more frequency bands supported by the communications device may comprise one or more of: one or more frequency bands; supported combinations of frequency bands; one or more parts of frequency bands; and supported combinations of one or more parts of a frequency band.

According to another aspect, there is provided an apparatus comprising at least one processor and at least one memory including a computer program code, the at least one memory and computer program code configured to, with the at least one processor, cause the apparatus at least to: receive a first message from a communications device, communications with the communication device being associated with a second identity, said first message comprising information identifying at least a part of at least one first frequency band used by the communications device when communicating with a first network, communications with the first network being associated with a first identity, different to the second identity; and in response causing information stored about the at least a part of at least one first frequency band to be updated.

The information identifying at least a part of at least one first frequency band may comprise one of an explicit index; a relative index and the first frequency band.

The at least one memory and computer program code may be configured to, with the at least one processor, cause the apparatus at least to update information stored in relation to one or more combinations of frequency bands in dependence on if a respective combination comprises the at least a part of at least one first frequency band.

The at least one memory and computer program code may be configured to, with the at least one processor, cause the apparatus at least to one of enable and disable the at least a part of at least one first frequency band in response to the first message.

The at least one memory and computer program code may be configured to, with the at least one processor, cause the apparatus at least to one of enable and disable one or more combinations of frequency bands which do not comprise the at least a part of at least one first frequency band.

The at least one memory and computer program code may be configured to, with the at least one processor, cause the apparatus at least to modify one or more combinations of frequency bands which include the at least one first frequency band to disable at least a part of the at least one first frequency band in the respective combination.

The at least one memory and computer program code is configured to, with the at least one processor, cause the apparatus at least to receive a second message from the communications device when the at least a part of the at least one first frequency band is no longer available for communication with the first network.

The second message may comprise information identifying the at least a part of the at least one first frequency band.

The second message may comprise reset information.

The reset information may be provided by an index.

The at least one memory and computer program code may be configured to, with the at least one processor, cause the apparatus, at least to in response to the second message, cause information stored about the at least a part of the at least one first frequency band to be updated.

The first message may comprise information indicating when said at least a part of the at least one first frequency band is usable in communications between the apparatus and said communications device.

The information indicating when at least a part of the at least one first frequency band is usable in communications between the apparatus and said communications device may comprise information indicating one or more services.

According to another aspect, there is provided an apparatus in a communications device supporting a plurality of different identities, the apparatus comprising means for: causing communication with a first network using at least a part of at least one first frequency band, communication with the first network being associated with a first identity; and causing a first message to be transmitted to a second network, communication with the second network being associated with a second, different identity, said message comprising information indicating the at least a part of at least one first frequency band.

One or more of the identities comprises one or more of: a universal subscriber identity module identity; an electronic subscriber identity module identity; and a subscriber identity module identity.

The at least a part of at least one first frequency band may comprise a group of a plurality of frequency bands.

The first network may be one of the same or different to the second network.

The first network may be provided by a first network operator and the second network may be provided by a different network provider.

The first network may be provided by a first network operator and the second network may be provided by the first network provider.

The means may be for causing a second message to be transmitted to the second network, when the at least a part of at least one first frequency band is no longer available for communicating with the first network, the second message comprising information indicating to the second network that the at least a part of at least one first frequency band is no longer available for communications with the first network The second message may comprise information identifying the at least a part of at least one first frequency band.

The second message may comprise a reset message.

The reset message may clear the information from the first message.

The means may be for, prior to communication with the first network using the at least a part of at least one first frequency band, causing at least one third message to be transmitted to the first network and at least one third message to be transmitted to the second network, at least one third message comprising information about one or more frequency bands supported by the communications device.

The information about one or more frequency bands supported by the communications device may comprise one or more of: one or more frequency bands; supported combinations of frequency bands; one or more parts of frequency bands; and supported combinations of one or more parts of a frequency band.

According to another aspect, there is provided an apparatus comprising means for: receiving a first message from a communications device, communications with the communication device being associated with a second identity, said first message comprising information identifying at least a part of at least one first frequency band used by the communications device when communicating with a first network, communications with the first network being associated with a first identity, different to the second identity; and in response causing information stored about the at least a part of at least one first frequency band to be updated.

The information identifying at least a part of at least one first frequency band may comprise one of an explicit index; a relative index and the first frequency band.

The means may be for updating information stored in relation to one or more combinations of frequency bands in dependence on if a respective combination comprises the at least a part of at least one first frequency band.

The means may be for at least one of enabling and disabling the at least a part of at least one first frequency band in response to the first message.

The means may be for at least one of enabling and disabling one or more combinations of frequency bands which do not comprise the at least a part of at least one first frequency band.

The means may be for modifying one or more combinations of frequency bands which include the at least one first frequency band to disable at least a part of the at least one first frequency band in the respective combination.

The means may be for receiving a second message from the communications device when the at least a part of the at least one first frequency band is no longer available for communication with the first network.

The second message may comprise information identifying the at least a part of the at least one first frequency band.

The second message may comprise reset information.

The reset information may be provided by an index.

The means may be for, in response to the second message, causing information stored about the at least a part of the at least one first frequency band to be updated.

The first message may comprise information indicating when said at least a part of the at least one first frequency band is usable in communications between the apparatus and said communications device.

The information indicating when at least a part of the at least one first frequency band is usable in communications between the apparatus and said communications device may comprise information indicating one or more services.

According to another aspect, there is provided a method comprising: causing communication with a first network using at least a part of at least one first frequency band, communication with the first network being associated with a first identity; and causing a first message to be transmitted to a second network, communication with the second network being associated with a second, different identity, said message comprising information indicating the at least a part of at least one first frequency band.

One or more of the identities comprises one or more of: a universal subscriber identity module identity; an electronic subscriber identity module identity; and a subscriber identity module identity.

The at least a part of at least one first frequency band may comprise a group of a plurality of frequency bands.

The first network may be one of the same or different to the second network.

The first network may be provided by a first network operator and the second network may be provided by a different network provider.

The first network may be provided by a first network operator and the second network may be provided by the first network provider.

The method may comprise causing a second message to be transmitted to the second network, when the at least a part of at least one first frequency band is no longer available for communicating with the first network, the second message comprising information indicating to the second network that the at least a part of at least one first frequency band is no longer available for communications with the first network The second message may comprise information identifying the at least a part of at least one first frequency band.

The second message may comprise a reset message.

The reset message may clear the information from the first message.

The method may comprise, prior to communication with the first network using the at least a part of at least one first frequency band, causing at least one third message to be transmitted to the first network and at least one third message to be transmitted to the second network, at least one third message comprising information about one or more frequency bands supported by the communications device.

The information about one or more frequency bands supported by the communications device may comprise one or more of: one or more frequency bands; supported combinations of frequency bands; one or more parts of frequency bands; and supported combinations of one or more parts of a frequency band.

The method may be performed by an apparatus. The apparatus may be in a communications device or be a communications device.

According to another aspect, there is provided a method comprising: receiving a first message from a communications device, communications with the communication device being associated with a second identity, said first message comprising information identifying at least a part of at least one first frequency band used by the communications device when communicating with a first network, communications with the first network being associated with a first identity, different to the second identity; and in response causing information stored about the at least a part of at least one first frequency band to be updated.

The information identifying at least a part of at least one first frequency band may comprise one of an explicit index; a relative index and the first frequency band.

The method may comprise updating information stored in relation to one or more combinations of frequency bands in dependence on if a respective combination comprises the at least a part of at least one first frequency band.

The method may comprise at least one of enabling and disabling the at least a part of at least one first frequency band in response to the first message.

The method may comprise at least one of enabling and disabling one or more combinations of frequency bands which do not comprise the at least a part of at least one first frequency band.

The method may comprise modifying one or more combinations of frequency bands which include the at least one first frequency band to disable at least a part of the at least one first frequency band in the respective combination.

The method may comprise receiving a second message from the communications device when the at least a part of the at least one first frequency band is no longer available for communication with the first network.

The second message may comprise information identifying the at least a part of the at least one first frequency band.

The second message may comprise reset information.

The reset information may be provided by an index.

The method may comprise, in response to the second message, causing information stored about the at least a part of the at least one first frequency band to be updated.

The first message may comprise information indicating when said at least a part of the at least one first frequency band is usable in communications between the apparatus and said communications device.

The information indicating when at least a part of the at least one first frequency band is usable in communications between the apparatus and said communications device may comprise information indicating one or more services.

The method may be performed by an apparatus. The apparatus may be a base station or in a base station.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above. Any one of the above described features may be combined with any one or more other of the described features to provide one or more additional example embodiments, in addition to the various described example embodiments.

Various other aspects are also described in the following detailed description and in the attached claims.

BRIEF DESCRIPTION OF THE FIGURES

Example embodiments will now be described, by way of example only, with reference to the accompanying Figures in which:

FIG. 7 shows a second signalling flow;

DETAILED DESCRIPTION OF THE FIGURES

The following embodiments are exemplifying only. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other example embodiments.

As is known, wireless systems can be divided into cells, and are therefore often referred to as cellular systems. Typically, an access point such as a base station provides at least one cell. The cellular system can support communications between communications devices such as user equipment (UE).

In the following, different exemplifying embodiments will be described using, as an example of an access architecture to which some example embodiments may be applied, a radio access architecture based on long term evolution advanced (LTE Advanced, LTE-A) or new radio (NR) (or can be referred to as 5G), without restricting the example embodiments to such an architecture, however. It is clear for a person skilled in the art that the example embodiments may also be applied to other kinds of communications networks. Some examples of other options for suitable systems are the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

In the following certain example embodiments are explained with reference to communications devices capable of communication via a wireless cellular system and communication systems serving such communications devices. Before explaining in detail the exemplifying embodiments, some principles of an example wireless communication system, access systems thereof, and communications devices are briefly explained with reference to FIGS. 1 to 5.

Figure 1:
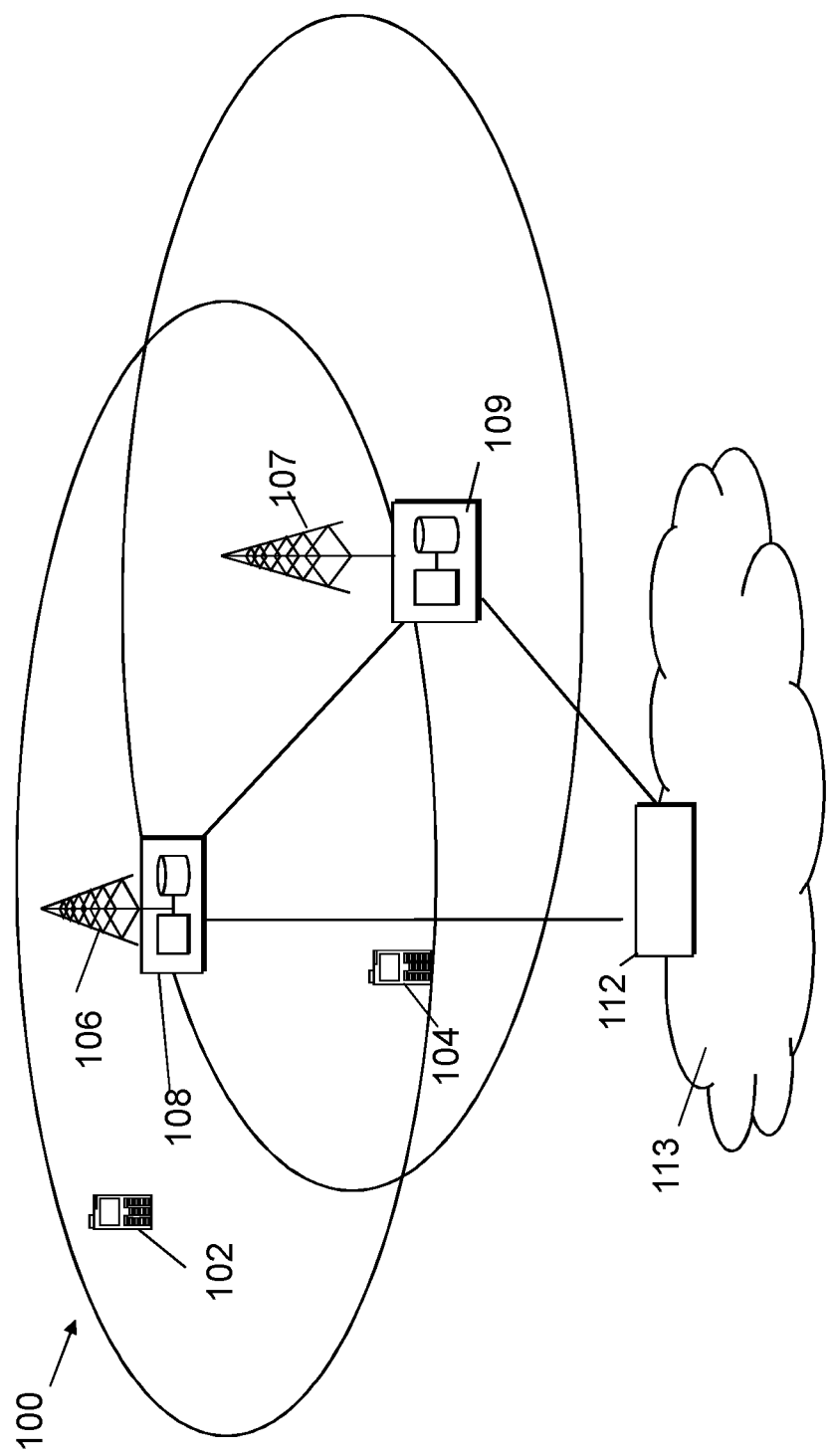
FIG. 1 shows a schematic diagram of an example communication system comprising a plurality of base stations and communication devices.

In a wireless communication system 100, such as that shown in FIG. 1, wireless communication devices, for example, user equipment (UE) or MTC (machine type communication) devices 102 and 104 are provided wireless access via at least one base station 106 and 107 or similar wireless transmitting and/or receiving wireless infrastructure access node or point. Such an access node can be, for example, a base station or an eNodeB (eNB), or in a 5G system a Next Generation NodeB (gNB), or other wireless infrastructure node. These access nodes will be generally referred to as base stations. Base stations are typically controlled by at least one appropriate controller apparatus, so as to enable operation thereof and management of communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity. In FIG. 1 control apparatus 108 and 109 are shown to control the respective macro level base stations 106 and 107. In some systems, the control apparatus may additionally or alternatively be provided in a separate entity.

In FIG. 1 base stations 106 and 107 are shown as connected to a wider communications network 113 via gateway 112.

The communication devices will be referred to as a UE (user equipment) in this document but it should be appreciated that the device may be any suitable communications device and the term UE is intended to cover any such device. Some examples of communications devices are discussed below and as used in this document the term UE is intended to cover any one or more of those devices and/or any other suitable device.

Figure 2:
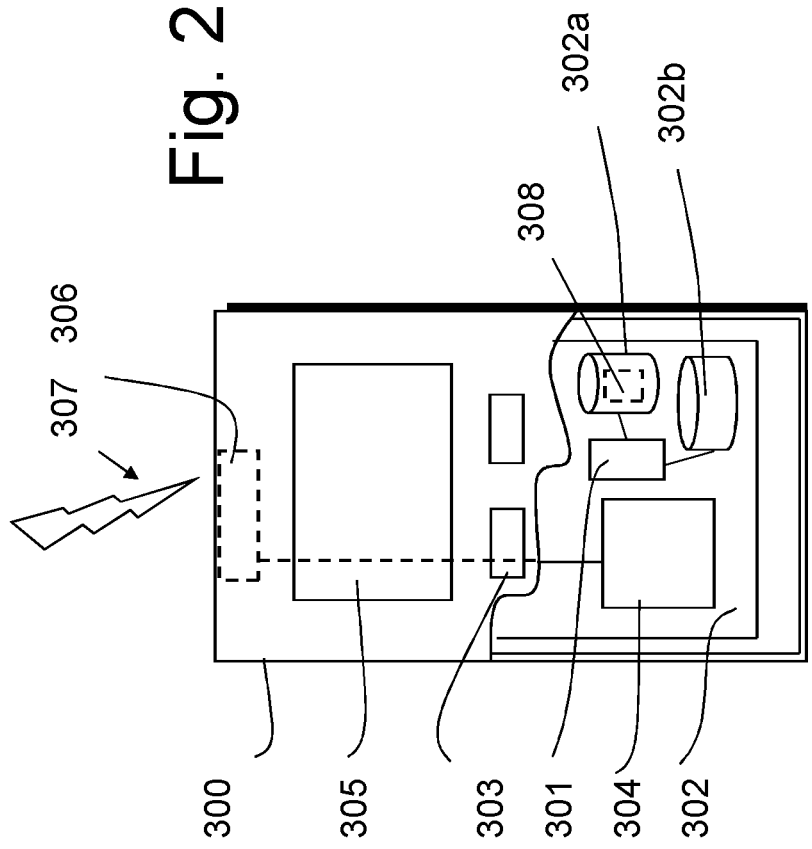
FIG. 2 shows a schematic diagram of an example communication device.

FIG. 2 illustrates an example of a communications device 300, such as the wireless communications devices 102, 104 and 105 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302*a*.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Communication protocols and/or parameters which shall be used for the connection are also typically defined. The communications devices may access the communication system based on various access techniques.

Figure 3:
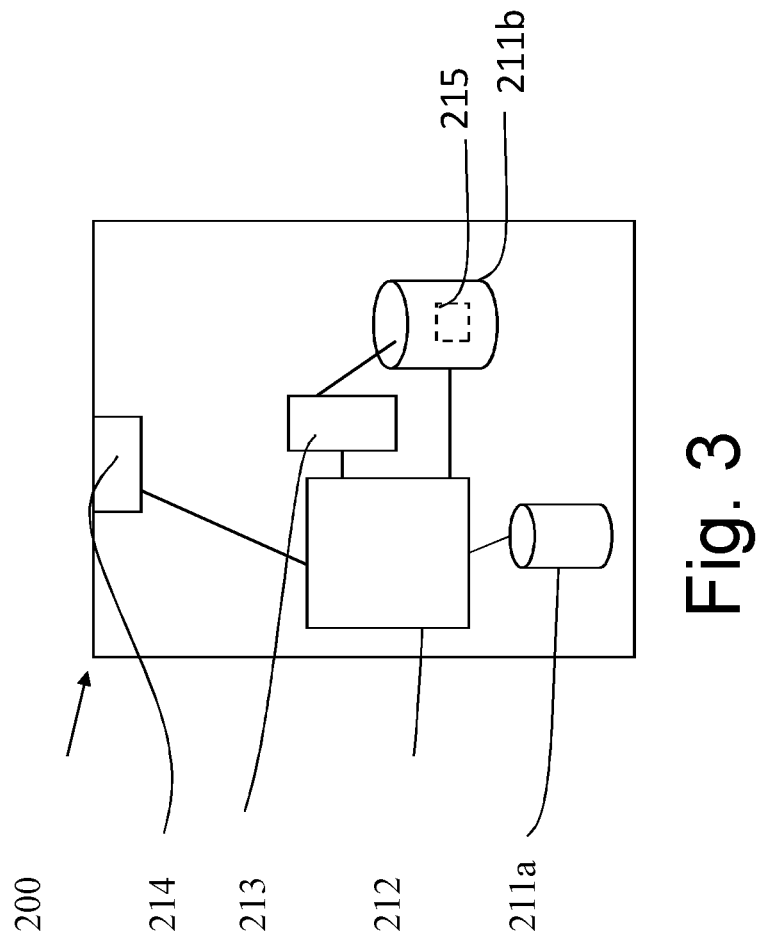
FIG. 3 shows a schematic diagram of an example apparatus provided in an access node.

An example apparatus is shown in FIG. 3. FIG. 3 shows an example of an apparatus 200 for a base station. The apparatus comprises at least one memory. The at least one memory may be at least one random access memory (RAM) 211*a* and/or at least one read only memory (ROM) 211*b*, at least one processor 212, 213 and an input/output interface 214. The at least one processor 212, 213 is coupled to the RAM 211*a* and the ROM 211*b*. The at least one processor 212, 213 may be configured to execute an appropriate software code 215 to implement one or more of the following aspects. The software code 215 may be stored in the ROM 211*b*.

Figure 4:
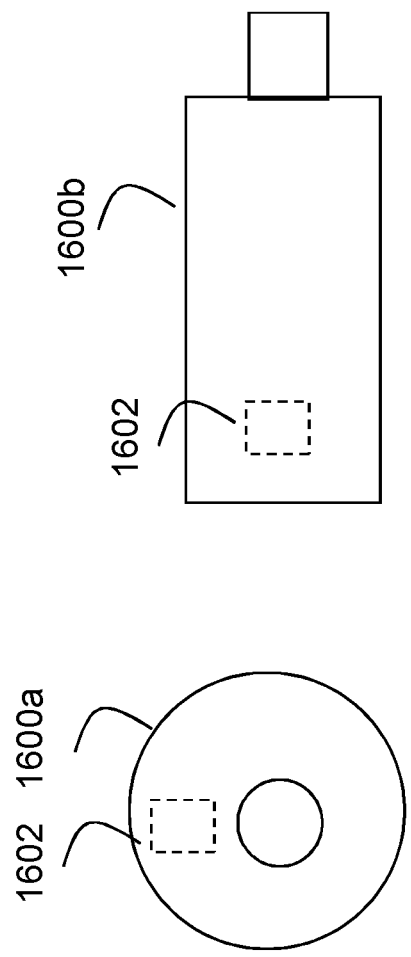
FIG. 4 shows a schematic representation of a non-volatile memory medium storing instructions which when executed by a processor allow a processor to perform one or more of the steps of the method of some embodiments.

FIG. 4 shows a schematic representation of non-volatile memory media 1600*a* (e.g. computer disc (CD) or digital versatile disc (DVD)) and 1600*b* (e.g. universal serial bus (USB) memory stick) storing instructions and/or parameters 1602 which when executed by a processor allow the processor to perform one or more of the steps of any of the methods of any of the example embodiments.

Figure 5:
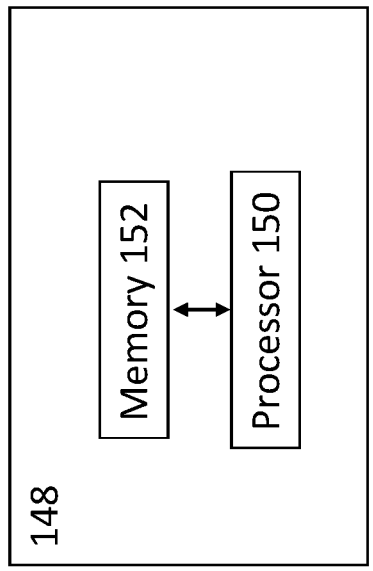
FIG. 5 shows an example apparatus which may be provided in a base station or a communications device or a network node.

FIG. 5 shows an apparatus 148. The apparatus 148 may be provided in the base station or in a communications device or in a core network node. The apparatus may comprise at least one processor 150 and at least one memory 152 including computer code for one or more programs. This apparatus may be configured to cause some embodiments to be performed.

Some communication devices are configured to have two or more separate subscriber identities. These two or more different subscriber identities may be supported by respective modules or functions.

In some example embodiments, the different subscriber identities may be supported by different subscriber identity modules (SIM) and/or universal subscriber identity module cards (USIM) and/or electronic subscriber identity modules (eSIM). These devices may be called multi-SIM/multi-USIM/multi-eSIM devices.

In some embodiments, one of the subscriber identities may be supported by one of a SIM, USIM, or eSIM and a different one of the subscriber identities may be supported by a different one of a SIM, USIM, or eSIM. For example one subscriber identity may be supported by an eSIM and a different subscriber identity supported by a USIM or the like. A SIM/USIM/eSIM or any other module or function supporting a subscriber identity can be either physical and/or virtual, for example, provided in software. The subscriber identities may belong to the same operator/network. In other examples, the subscriber identities may belong to two more different operators/networks.

Some example embodiments may be provided in 5G NR and/or LTE systems and/or any other suitable system.

It has been proposed that there be a mechanism for delivering paging destined to USIM A while the UE is actively communicating with USIM B. It should be appreciated that in some of the described embodiments below, reference is made to a device having two USIMs. It should be appreciated that this is by way of example only and other embodiments may have any suitable two or more modules or functions supporting a two or more subscriber identities. Some examples of the modules or functions have been described previously.

It has been proposed that there be a mechanism for allowing for suspension (or release) and resumption of an ongoing connection in the first system associated with USIM A, so that the UE can temporarily leave to the second system associated with USIM B, and then return to the first system in a network-controlled manner. The network may need to be able to handle MT (mobile terminated) data or MT control-plane activity occurrence on a suspended connection.

It has been proposed that there be a mechanism for avoidance of paging collisions occurring in the UE between USIM A and USIM B.

It has been proposed that there be a mechanism for handling of emergency calls and sessions.

It has been proposed that there be a mechanism for handling service prioritization. The UE behaviour upon reception of paging information may be driven by USIM configuration or user preferences or both.

Some embodiments may be used where the M-USIM has two or more USIMs. For illustrative purposes, some embodiments are described where the M-USIM has two USIMs. However, other embodiments may have a M-USIM with three or more USIMs.

There may be single Rx/single Tx or dual Rx/single Tx or dual Rx/dual Tx or single Rx/dual Tx implementations for the UE in some embodiments.

Some embodiments may use multi-USIM implementations having one or more common radio and baseband components that are shared among the two or more USIMs. Other embodiments may have one or more separate radio and/or baseband components that are not shared by all the USIM components. Some embodiments may have one or more radio and/or radio components that are dedicated to a respective USIM.

Some embodiments may support mechanisms for receiving paging or measurement for USIM A while the UE is actively communicating with USIM B in a single connection or DC (dual connectivity) configuration or any other suitable connection.

Some embodiments may support mechanisms for allowing for suspension (or release) and resumption of an ongoing connection in a system, for example a 3GPP system, associated with USIM A, so that the UE can temporarily access a system, for example a 3GPP system, associated with USIM B.

Some embodiments may support mechanisms for avoidance of paging collisions occurring in the UE between USIM A and USIM B.

Some embodiments may support mechanisms for power control and UE capability coordination for voice service in USIM A and data service in USIM B.

Some embodiments may support the case where the USIMs are associated with the same mobile network operator or different mobile network operators.

A multi-USIM (MUSIM) device has two (dual) or more (multiple) simultaneous network subscriptions with respective identifiers. In the context of some 4G systems, this identifier is referred to as an International Mobile Subscriber Identity (IMSI). Each IMSI is associated with a USIM belonging to the same or different mobile network operator (MNO) (/mobile network virtual operator (MNVO)) as one or more other USIMs. In the context of some 5G systems, the identifiers are referred to as Subscription Permanent Identifier (SUPI).

In one scenario, a MUSIM device, for example device 104 of FIG. 1 is connected to one or more base stations, for example base stations 106 and 107. This may be with independent subscriptions.

In a first scenario, the two USIMs belong to the same MNO/MVNO, registered with two independent IDs at the core network and, may be using the same cell or two neighbour cells as a serving cell.

In a second scenario, the two USIMs belong to different MNOs and may be using two neighbouring or co-located cells from each MNO as a serving cell.

MUSIM devices are currently used. For example, they may be used in enhanced mobile broadband (eMBB) section. Some embodiments may provide control of the behaviour of a MUSIM device from the network.

With the increasing throughput, hence aggregated and/or connected DL and UL carriers as well as advanced antenna technologies like multiple input multiple output (MIMO), some USIM devices may have two or more Receive (RX) and/or transmit (TX) hardware chains. Due to some requirements on device size and weight as well as battery life time, some MUSIM devices may utilize the same USIM hardware for multi-USIM operation. For example the RX and TX chains may be shared at least partly across two or more USIMs available in the device.

Currently there are two types of MUSIM devices. The may be referred to depending on the supported simultaneous states on the USIMs. These may be RRC (radio resource control) states.

Dual SIM dual standby (DSDS) or multi USIM multi standby (MUMS): MUSIM devices which are registered with two or more independent subscriber IDs (USIMs) and can be in an idle mode such as an RRC_IDLE mode on all USIMs. However, the device is in a connected mode such as a RRC_CONNECTED mode with a single USIM at a given time.

Dual SIM dual active (DSDA) or multi USIM multi active (MUMA): MUSIM devices which are registered with two or more independent subscriber IDs (USIMs) and can be in an idle mode such as a RRC_IDLE mode on all USIMs. The device can maintain a connected mode such as RRC_CONNECTED mode activities on two or more or all USIMs.

The device behaviour with respect to the simultaneous handling of multiple USIMs may depend on the HW and/or SW capabilities of the device. For example, the device may have a single Rx/single Tx or may have dual Rx/single Tx or may have dual Rx/dual Tx or may have single Rx/dual Tx. A dual Rx allows the MUSIM device to simultaneously receive traffic from two networks, a single RX allows the MUSIM to receive traffic from only one network at a time, a single Tx allows MUSIM device to transmit traffic to only one network at one time etc.

For example, with single Rx/single Tx: The device is only capable of receiving traffic from one network and and/or transmitting traffic to one network at a time.

With dual Rx/single Tx, the device is capable of simultaneously receiving traffic from two networks but is capable of transmitting to only one network at a time.

With dual Rx/dual Tx, the device is capable of simultaneously receiving traffic from two networks and/or simultaneously transmitting traffic to two networks.

The communications device may report its capabilities in any suitable manner. For example this may be reported through RRC configuration. In this regard reference is made to a signal flow diagram of FIG. 6.

In T1, the base station is configured to send a message to the communications device when the communications device is in a connected mode such as an RRC_CONNECTED mode. This is a request for information about the capability of the communications device. The message may be a UECapabilityEnquiry.

In T2, the communications device is configured to report its capabilities in a response message transmitted from the communications device to the base station. The information may be used by the network. This response may be a UECapabilityInformation response.

The communications device may report supported frequency bands and frequency band-combinations through the RF (radio frequency) parameters.

For example one or more of a supported band list, a supported band combination list and an applied frequency band list filter may be provided.

The example below may be used in some NR systems:
RF-Parameters::=SEQUENCE {
   supportedBandListNR SEQUENCE (SIZE (1 . . . maxBands)) OF BandNR, supportedBandCombinationList BandCombinationList OPTIONAL,
   appliedFreqBandListFilter FreqBandList OPTIONAL,
   . . . ,
}

Band parameters may contain an indicator of supported bands for the communications device and/or the power class for the communications device. The number of bands which are supported may be dependent on the system. Some systems are such that the RRC configuration supports up to a max number of bands, for example 1024 bands.

The example below may be used in some NR systems:
BandNR::=SEQUENCE {
   bandNR FreqBandIndicatorNR,
   . . .
   ue-PowerClass ENUMERATED {pc1, pc2, pc3, pc4} OPTIONAL,
}

A band maybe specified through frequency band parameters which provide information of the supported aggregated bandwidth and/or the maximum number of carriers in the particular band.

The example below may be used in some NR systems:
FreqBandList::=SEQUENCE (SIZE (1 . . . maxBandsMRDC)) OF FreqBandInformation
FreqBandInformationNR::=SEQUENCE {
   bandNR FreqBandIndicatorNR,
   maxBandwidthRequestedDL AggregatedBandwidth OPTIONAL,--Need N
   maxBandwidthRequestedUL AggregatedBandwidth OPTIONAL,--Need N
   maxCarriersRequestedDL INTEGER (1 . . . maxNrofServingCells OPTIONAL,--Need N
   maxCarriersRequestedUL INTEGER (1 . . . maxNrofServingCells) OPTIONAL--Need N
}
AggregatedBandwidth::=ENUMERATED {mhz50, mhz100, mhz150, mhz200, mhz250, mhz300, mhz350, mhz400, mhz450, mhz500, mhz550, mhz600, mhz650, mhz700, mhz750, mhz800}

The band combination provided by the RF parameters may provide information on which bands and carriers can be simultaneously used by the communications device, for CA (carrier aggregation) or DC (dual connectivity) or the like. These combinations may be specified through the feature set combination parameters.

In some systems a message may be sent to communicate information (for example, assistance information for the communications device). This may assist the base station so that the base station does not configuring settings which the communications device cannot satisfy. This message may be used to communicate adjustments to one or more of the Uu air interface delay, connected mode DRX (discontinuous reception) cycle length, and overheating information.

In some embodiments, a single USIM communication device may have several RX and TX chains. Some devices may have 5-8 RX chains and 3-4 TX chains. This is by way of example and different communication devices may have different numbers of RX and TX chains to these example ranges. This may be to support carrier aggregation (CA) and Dual Connectivity (DC) and/or diversity/MIMO (multiple input multiple output) requirements and/or any other suitable requirements.

However, the communications device may not be designed to support 5-8 parallel independent RX and/or 3-4 parallel independent TX due to one or more of below given reasons and/or other HW limitations.

Depending on the RF HW design not all RX and TX chains may cover the full range of frequencies—i.e. low band (LB), mid band (MB), high band (HB), ultra-high band (UHB), and millimeter-wave (mmW)-used in cellular communications and to support of MIMO.

Depending on the RF HW design, some front-end components may be shared for carriers within the same band-group. One example is support of two simultaneous UL at low-band (less than 1 GHZ) which in most HW is not available as it requires two distinct PA power amplifier modules. This PA module may be associated with a relatively high cost and current consumption.

Intermodulation products across several RX frequencies and TX frequencies as well as the local oscillator may generate continuous waveforms (CW) as well as modulated spurious signals which can act as interference for the received signals. In-device self-interference cancellation is applied to cancel generated CW and the modulated spurs. However, this may require dynamic time-accurate synchronized knowledge on RX and TX Los (local oscillators).

There may be a limited number of antennas and associated antenna tuners and their supported bands and bandwidth.

The device's supported band combinations would be known by the NW through UE's capability report. The NW may therefore exclude the problematic bands in carrier aggregation (CA) and dual connectivity (DC) scenarios.

A base station in connection with a multi USIM device (at least two subscriptions for example having two distinct USIMs, which may or may not be associated with the same network) does not have information about which frequency band(s) is (are) already in use by the device for another USIM. Due to the lack of this information, a base station might falsely assume it can configure the device to use a frequency band which is already in use by the other USIM or cannot be used in combination with the frequency in use on another USIM and, hence, is not supported despite it being listed in the supported frequency band/band combinations.

In one embodiment, the UE can use the assistance information message such as described to report a reduction in its capabilities. This mechanism may be more suited to changes which are occurring rarely and where the information is not time critical. This messaging is based on RRC signalling.

Some embodiments may need to address changes which happen within a couple of TTIs (transmission time intervals).

Some embodiments may provide a mechanism for faster reporting of capability changes.

Some embodiments may provide a mechanism for a communication device to report to the network, the frequency band(s) which is (are) currently in use for other purposes and a set of rules applied by the receiving base station such as for example a gNB to potentially exclude this band and other bands which the device is not able to simultaneously support with the indicated band in use.

Some embodiments may provide a signalling mechanism to indicate a band being used temporarily. In this document, this is referred to as a "band usage indicator". This will provide information about a band being used by one USIM to the network associated with another of the USIMs.

The trigger for some embodiments may be a degradation or restriction caused by the use of one or more additional active RF chain(s) in the multi-USIM device. In some embodiments, the indication will be transmitted each time a different frequency is used by a USIM.

Some example embodiments may provide one or more actions done by the network to update the already indicated supported frequency bands and/or frequency band combinations (such as described previously in relation to FIG. 6).

Some example embodiments provide one or more options to reset/cancel previously indicated frequency band usage indication(s).

Some example embodiments may provide a mechanism allowing the NW to update the list of supported UE frequency bands and band combinations associated with one USIM. This may be without the providing a new full set of UE capabilities to the network. This is based on the usage of one or more frequencies or bands associated with at least one other USIM.

Some embodiments may provide a signalling mechanism to reset/cancel indicated frequency bands in use.

Reference is made to FIG. 7 which shows a signalling flow of some embodiments. A multi-SIM device is provided with a first SIM, SIM 1 and a second SIM, S2. The first SIM, SIM 1 is associated with a first network NW1 and the second SIM, SIM 2 is associated with a second network, NW2. It should be appreciated that the communications device will communicate with a base station. The base station may optionally provide information which has received from the communications device to one or more network nodes or entities. Alternatively or additionally, the base station may store information about which frequencies and/or frequency bands are in use and/or available for use.

In S1, the communications device with the first and second SIMs transitions to a mode where it is connected both the first network and the second network. In some embodiments, the mode where it is connected may be a RRC (radio resource control) connected mode.

In S2, the user device will provide the device capability information to the first network.

In S3, the user device will provide the device capability information to the second network.

It should be appreciated that S2 and S3 may take place in any order or at the same time.

Figure 6:
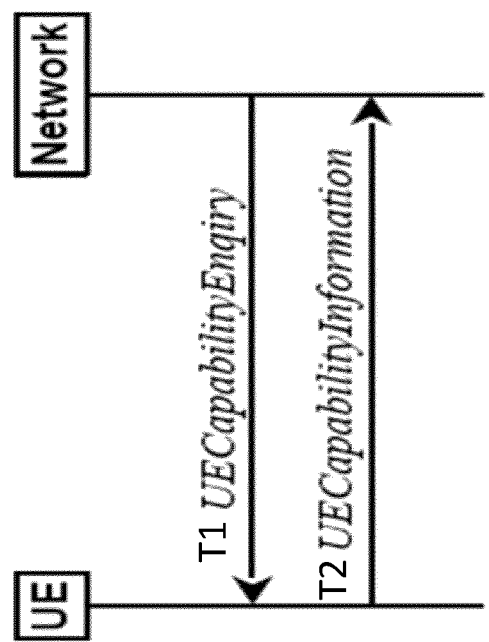
FIG. 6 shows a first signalling flow.

It should be appreciated that S2 and/or S3 may be as described in relation to FIG. 6 and comprise a device capability query from the network and a device capability response from the device.

The capability information may comprises any suitable information. In some embodiments, the device capability information may comprise a frequency band list and/or supported frequency band combinations.

In S4, frequency band A is being used for communication between the first SIM and the first network.

In S5, in response to determining that a frequency band is being used for one or more USIMs, the device signals to serving cell of the second network, that band A is in use. Thus the communications device transmits a band usage indicator to the second network to indicate that Band A is in use.

In S6 in response the receiving the band usage indicator, the second network does the following:

1. Disable this band (band A) as a supported frequency band. This will update the frequency band list. This may the FreqBandList in LTE or supportedBandList in NR.
2. Modify the supported band combinations.

The modifying of the supported band combinations may comprise the following:

2a. In a first option, select all band combinations which do not include band A (which may be assumed to be not supported in combination with A) and disable these. In this regard, reference is made to Table 1 below, which illustrates an illustrative example. The band combinations indicate the band combinations which can be supported at the same time by the device using one or more of the USIMs. In this example, there are four supported band combinations, A+B, A+B+C, B+C, and F+H. After apply step 2, combinations F+H and B+C are disabled.

In a second option, step 2a may comprise identifying all bands which are not in any combination indicated to be supported with the band in use and only disable these. In the provided example of Table 1, this means that B+C would not be disabled as it is indicated with A in combination A+B+C. F+H is still disabled.

2b. Select all combinations which include frequency band A and disable A from these combinations. So, if the device has indicated a combination of frequency bands, say A, B and C, it will not cause any problems that the NW 2 assigns B and/or C for use in the second network. The new combination is therefore B and/or C.

TABLE 1

| Single SIM/normal supported band combination list | List after applying 2a (option 1) | List after applying 2a (option 2) | List after applying step 2b |
|---|---|---|---|
| A + B | A + B | A + B | B |
| A + B + C | A + B + C | A + B + C | B + C |
| B + C | Disabled | B + C | Disabled |
| F + H | Disabled | Disabled | Disabled |

In S7, the connection between the first SIM and the first network transitions to an idle state. This may be an RRC Idle mode or the like.

In a first option for S8, the device signals to the network a band usage indicator which indicates band A. This is to the second network.

This may be done using an index in a supported frequency band list (e.g. in supportedBandListNR when using NR). This may be an explicit, or relative index in the band list. The relative index may be with respect to the primary frequency band. With an explicit indication the index n in the frequency band list of supported frequency bands combinations is signalled. By way of example only, in Rel-15 there is a maximum of 1280 frequency bands in the list, which requires a maximum of 11 bits payload for unique indication.

In a second option for S8, the device may signals a set of "most likely" frequency bands. The "band usage indicator" is then an index to this preconfigured table. An example is provided in Table 2.

| State | Degradation |
|---|---|
| 0 | Frequency band index n1 is used |
| 1 | Frequency band index n2 is used |
| ... | |
| N | RESET ALL |

Table 2. Example of mapping between UE capability degradations and states used to simplify the band usage indicator with one of the states reserved for a reset message.

The second option may be useful when the frequency bands to be used by the other USIM(s) are predictable. In some scenarios, the USIM may only use a handful of frequency bands associated to the network which it is connected to. This may be depending on the network. For example some bands may be associated with NR and some bands may be associated with LTE. In this case, using this option reduces the number of bits used for the "band usage indicator".

In S9, on receiving the band usage indicator indicating the band A, the NW will reverse 2a and 2b, re-enabling the frequency band and the impacted combinations.

In one example embodiment, Option 1 and/or Option 2 is extended to include a "reset all band usage indicators" message, enabling the UE to instruct the NW to ignore all previously received band usage indications (e.g. a "RESET ALL" action).

For Option 2, one of the configured states can be used for this message.

For Option 1, an index in the frequency band list can be reserved and to be used as a "RESET ALL" message. The index (e.g. 1281) may be configurable.

In another embodiment, the band usage indicator is extended with an attribute and is provided along with the indication, such that the frequency band is not just disabled completely but limited in the supported bandwidth.

In another example embodiment, the message may be extended to include which parts of the bandwidth is being used by the other chain (with a frequency gap).

In another embodiment, the band usage indicator may indicate whether the NW is still allowed to use the associated frequency bands for specific services, e.g. despite band A being in use, the combination of A+B is still valid for e.g. paging. The NW receiving the "band usage indicator" may ignore this in some circumstances. For example if there is a high priority paging message—e.g. ETWS (earthquake and tsunami warning system)—and limited to use the specific frequency band.

The communications capability with respect to the supported band combinations is generally a HW limitation when one or more HW is reused for different bands. There may be frequency bands which belong to the same group. In some embodiments, the frequency band groups are used and the indication may be based on groups instead. Step 1 and 2a and 2b are then iterated for all frequency bands in the group. An example of frequency band groups in sub 6 GHz could be <1 GHz (LowBand LB), 1.1 ... 1.5 GHz (LowMidBand LM), 1.6 ... 2.2 GHz (MidBand MB), 2.3 ... 2.7 GHZ (HighBand HB), and >3.4 GHz (UltraHighBand UHB).

In some example embodiments, the capability associated with a communications device reported to each NW may be a subset of bands and/or band/bandwidth combinations. This may be as specified at least partially by an associated standard and/or at least partially supported by the implementation of the communications device. In some embodiments, the MUSIM communications device may also support some band combinations which are not defined by one or more associated standards.

The communications device may be capable of supporting some band combinations which are not defined by an associated standard which may not be reported to the network. Hence, reporting the "band usage indicator" to NW and letting the NW exclude the "problematic" bands and combinations for the other USIM may not be useful in some scenarios. In a UE-specific implementation the UE may apply some pre-processing of the information considering its full capabilities (i.e. also those not known by NW) and it notifies the other NW with a "modified band(s) in use" to optimize the full usage of UE HW.

Some example embodiments may allow the NW to improve spectral utilization and/or reduce potential performance degrade due to MUSIM UE down-prioritizing some services with one USIM due to a temporary limitation for the support of one or more frequency bands due to usage from another USIM.

Figure 8:
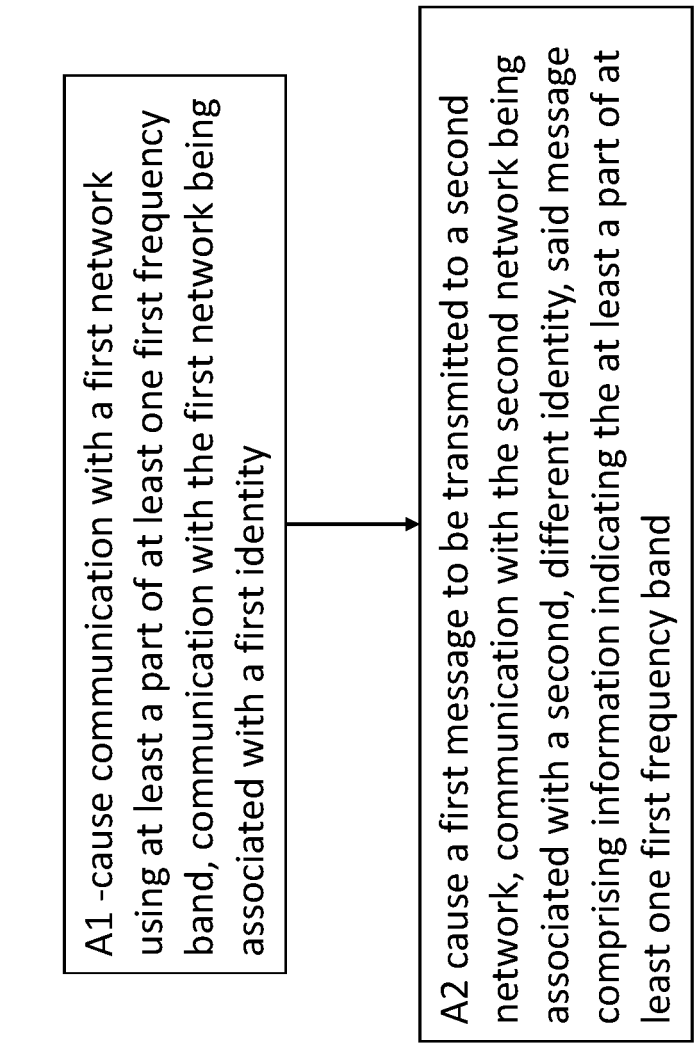
FIG. 8 shows a first example method.

Some example embodiments provide a method. The method may be performed by an apparatus. The apparatus may be a communications device or provided in the communications device. The apparatus may be as shown in FIG. 5. Reference is made to FIG. 8.

The method comprises at A1 causing communication with a first network using at least a part of at least one first frequency band. The communication with the first network is associated with a first identity.

The method comprises at A2 causing a first message to be transmitted to a second network. Communication with the second network is associated with a second, different identity. The message comprises information indicating the at least a part of at least one first frequency band.

Figure 9:
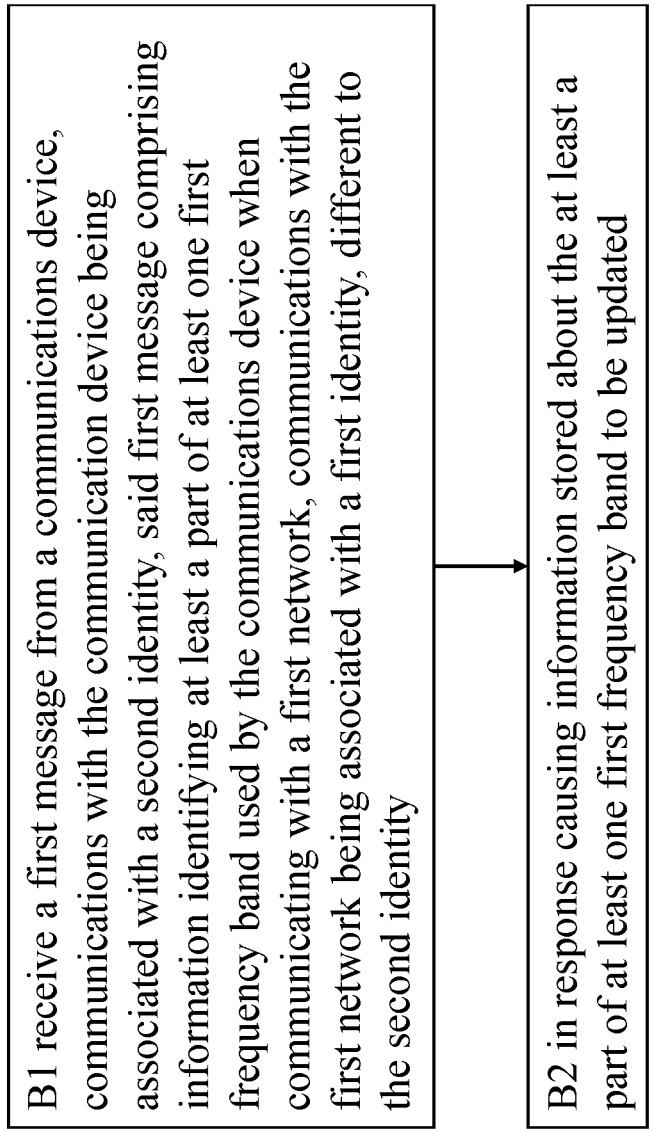
FIG. 9 shows a second example method.

Some example embodiments provide another method. The method may be performed by an apparatus. The apparatus may be a base station or provided in the base station. The apparatus may be as shown in FIG. 5. Reference is made to FIG. 9.

The method comprises at B1 receiving a first message from a communications device. The communications with the communication device is associated with a second identity. The first message comprises information identifying at least a part of at least one first frequency band used by the communications device when communicating with a first network. Communications with the first network is associated with a first identity, different to the second identity.

In B2, the method comprises, in response, causing information stored about the at least a part of at least one first frequency band to be updated.

The base station may be provided in a second network.

It is noted that while the above describes example embodiments, there are several variations and modifications which may be made to the disclosed solution without departing from the scope of the present invention. In particular, different example embodiments have been described. Different features from different embodiments may be combined.

The example embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various example embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some example embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively or additionally some example embodiments may be implemented using circuitry. The circuitry may be configured to perform one or more of the functions and/or method steps previously described. That circuitry may be provided in the base station and/or in the communications device and/or a network node.

As used in this application, the term "circuitry" may refer to one or more or all of the following:
  (a) hardware-only circuit implementations (such as implementations in only analogue and/or digital circuitry);
  (b) combinations of hardware circuits and software, such as:
    (i) a combination of analogue and/or digital hardware circuit(s) with software/firmware and
    (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus in a communications device supporting a plurality of different identities, the apparatus comprising:
at least one processor; and at least one memory including computer program code, the at least one memory and computer program code is configured to, with the at least one processor, cause the apparatus at least to:
transmit a first message to a first network and a second network, wherein the first message comprises information regarding one or more frequency bands supported by the communications device;
with the first network using at least a part of at least one first frequency band of the one or more frequency bands, wherein the communication with the first network is associated with a first identity, and wherein the first identity is associated with at least one of a first universal subscriber identity module (USIM) identity, and a first electronic subscriber identity module (eSIM) identity;
transmit a second message to the second network, wherein the second network is different from the first network, wherein the transmission of the second message to the second network is associated with a second identity, wherein the second identity is different from the first identity, wherein the second identity is associated with at least one of a second universal subscriber identity module (USIM) identity, and a second electronic subscriber identity module (eSIM) identity, and wherein the second message comprises information indicating the at least part of the at least one first frequency band is in use by the apparatus for communication with the first network;
transmit a second third message to the second network when the at least part of the at least one first frequency band is no longer in use for communication with the first network, wherein the third message comprising comprises:
information indicating, to the second network, that the at least part of the at least one first frequency band is no longer available for communication with the first network; and a reset message configured to instruct the second network to discard the second message, wherein the reset message is provided as a reserved index within a list of the one or more frequency bands supported by the communication device;
wherein the second message is a band usage indicator transmitted when the apparatus determines that the at least part of the at least one first frequency band is used for the communication with the first network, and as a result of the transmission of the band usage indicator;
causing the at least part of the at least one frequency band to be disabled as a supported frequency band for the second network;
causing a modification of supported band combinations by disabling all frequency bands that are not supported with the at least part of the at least one frequency band; and
the at least part of the at least one frequency band to be disabled from the modified supported band combinations.

2. A method, comprising:
transmitting a first message to a first network and a second network, wherein the first message comprises information regarding one or more frequency bands supported by the communications device;
communicating with the first network using at least a part of at least one first frequency band of the one or more frequency bands, wherein the communication with the first network is associated with a first identity, and wherein the first identity is associated with at least one of a first universal subscriber identity module (USIM) identity, and a first electronic subscriber identity module (eSIM) identity;
transmitting a second message to the second network, wherein the second network is different from the first network, wherein the transmission of the second message to the second network is associated with a second identity, wherein the second identity is different from the first identity, wherein the second identity is associated with at least one of a second universal subscriber identity module (USIM) identity, and a second electronic subscriber identity module (eSIM) identity, and wherein the second message comprises information indicating the at least part of the at least one first frequency band is in use by the apparatus for communication with the first network;
transmitting a third message to the second network when the at least part of the at least one first frequency band is no longer in use for communication with the first network, wherein the third message comprises:
information indicating, to the second network, that the at least part of the at least one first frequency band is no longer available for communications with the first network; and a reset message configured to instruct the second network to discard the second message, wherein the reset message is provided as a designated state within a table that defines operational states for the one or more frequency bands;
wherein the second message is a band usage indicator transmitted when the apparatus determines that the at least part of the at least one first frequency band is used for the communication with the first network, and as a result of the transmission of the band usage indicator;
causing the at least part of the at least one frequency band to be disabled as a supported frequency band for the second network;

causing a modification of supported band combinations by disabling all frequency bands that are not supported with the at least part of the at least one frequency band; and causing the at least part of the at least one frequency band to be disabled from the modified supported band combinations.

3. A non-transitory computer-readable medium comprising computer-executable instructions that, when executed by a processor, cause the processor to perform the following operations:

transmitting a first message to a first network and a second network, wherein the first message comprises information regarding one or more frequency bands supported by the communications device;

communicating with the first network using at least a part of at least one first frequency band of the one or more frequency bands, wherein the communication with the first network is associated with a first identity, and wherein the first identity is associated with at least one of a first universal subscriber identity module (USIM) identity, and a first electronic subscriber identity module (eSIM) identity;

transmitting a second message to the second network, wherein the second network is different from the first network, wherein the transmission of the second message to the second network is associated with a second identity, wherein the second identity is different from the first identity, wherein the second identity is associated with at least one of a second universal subscriber identity module (USIM) identity, and a second electronic subscriber identity module (eSIM) identity, and wherein the second message comprises information indicating the at least part of the at least one first frequency band is in use by the apparatus for communication with the first network;

transmitting a third message to the second network when the at least part of the at least one first frequency band is no longer in use for communication with the first network, wherein the third message comprises:

information indicating, to the second network, that the at least part of the at least one first frequency band is no longer available for communications with the first network; and a reset message configured to instruct the second network to discard the second message, wherein the reset message is provided as a designated state within a table that defines operational states for the one or more frequency bands;

wherein the second message is a band usage indicator transmitted when the apparatus determines that the at least part of the at least one first frequency band is used for the communication with the first network, and as a result of the transmission of the band usage indicator;

causing the at least part of the at least one frequency band to be disabled as a supported frequency band for the second network;

causing a modification of supported band combinations by disabling all frequency bands that are not supported with the at least part of the at least one frequency band; and causing the at least part of the at least one frequency band to be disabled from the modified supported band combinations.

4. The apparatus of claim 1, wherein the first identity is associated with a first mobile network operator and the second identity is associated with a second mobile network operator, and wherein the first mobile network operator is different than the second mobile network operator.

* * * * *